United States Patent
Harode et al.

(10) Patent No.: US 11,792,111 B2
(45) Date of Patent: Oct. 17, 2023

(54) SYSTEMS AND METHODS FOR REPLICATING TRAFFIC STATISTICS ON REDUNDANT PACKET FORWARDING ENGINE SYSTEM

(71) Applicant: Juniper Networks, Inc., Sunnyvale, CA (US)

(72) Inventors: Pawankumar Harode, Bangalore (IN); Parag Dubey, Bangalore (IN); Anup Yellur Rao, Bengaluru (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/645,820

(22) Filed: Dec. 23, 2021

(65) Prior Publication Data
US 2023/0208747 A1 Jun. 29, 2023

(51) Int. Cl.
*G06F 15/16* (2006.01)
*H04L 45/16* (2022.01)
*H04L 45/00* (2022.01)

(52) U.S. Cl.
CPC .............. *H04L 45/16* (2013.01); *H04L 45/22* (2013.01)

(58) Field of Classification Search
CPC ....................................................... H04L 45/22
See application file for complete search history.

(56) References Cited

U.S. PATENT DOCUMENTS

| | | | |
|---|---|---|---|
| 5,854,786 A * | 12/1998 | Henderson | H04W 92/12 370/902 |
| 7,912,075 B1 * | 3/2011 | Holland | H04L 65/80 370/216 |
| 7,940,650 B1 | 5/2011 | Sandhir et al. | |
| 11,381,505 B2 * | 7/2022 | Cherukuru | H04L 47/193 |
| 2004/0208527 A1 * | 10/2004 | Mantin | H04B 10/032 398/33 |
| 2008/0068986 A1 * | 3/2008 | Maranhao | H04L 45/00 370/220 |
| 2010/0107154 A1 * | 4/2010 | Brahmavar | G06F 11/1433 717/176 |

(Continued)

FOREIGN PATENT DOCUMENTS

| | | |
|---|---|---|
| EP | 1584165 A2 | 10/2005 |
| WO | 2004062820 A2 | 7/2004 |

OTHER PUBLICATIONS

Extended European Search Report for Application No. EP22156611. 0, dated Jul. 12, 2022, 9 pages.

*Primary Examiner* — Hieu T Hoang
(74) *Attorney, Agent, or Firm* — Harrity & Harrity, LLP

(57) ABSTRACT

In some implementations, a first processing component of a network device may receive first traffic data obtained by a second processing component of the network device. The first processing component may store the first traffic data as residual statistics. The first processing component may obtain second traffic data associated with a copy of a traffic stream processed by the first processing component based on storing the first traffic data as the residual statistics. The first processing component may perform a switchover from the second processing component to the first processing component. The first processing component may determine current traffic data based on the residual statistics and the second traffic data. The current traffic data may be determined based on performing the switchover from the second processing component to the first processing component.

20 Claims, 11 Drawing Sheets

(56) References Cited

U.S. PATENT DOCUMENTS

2016/0149789 A1* 5/2016 Lang ................... H04L 43/10
                                                      370/401
2022/0210005 A1* 6/2022 Keane ................ H04L 41/0663

* cited by examiner

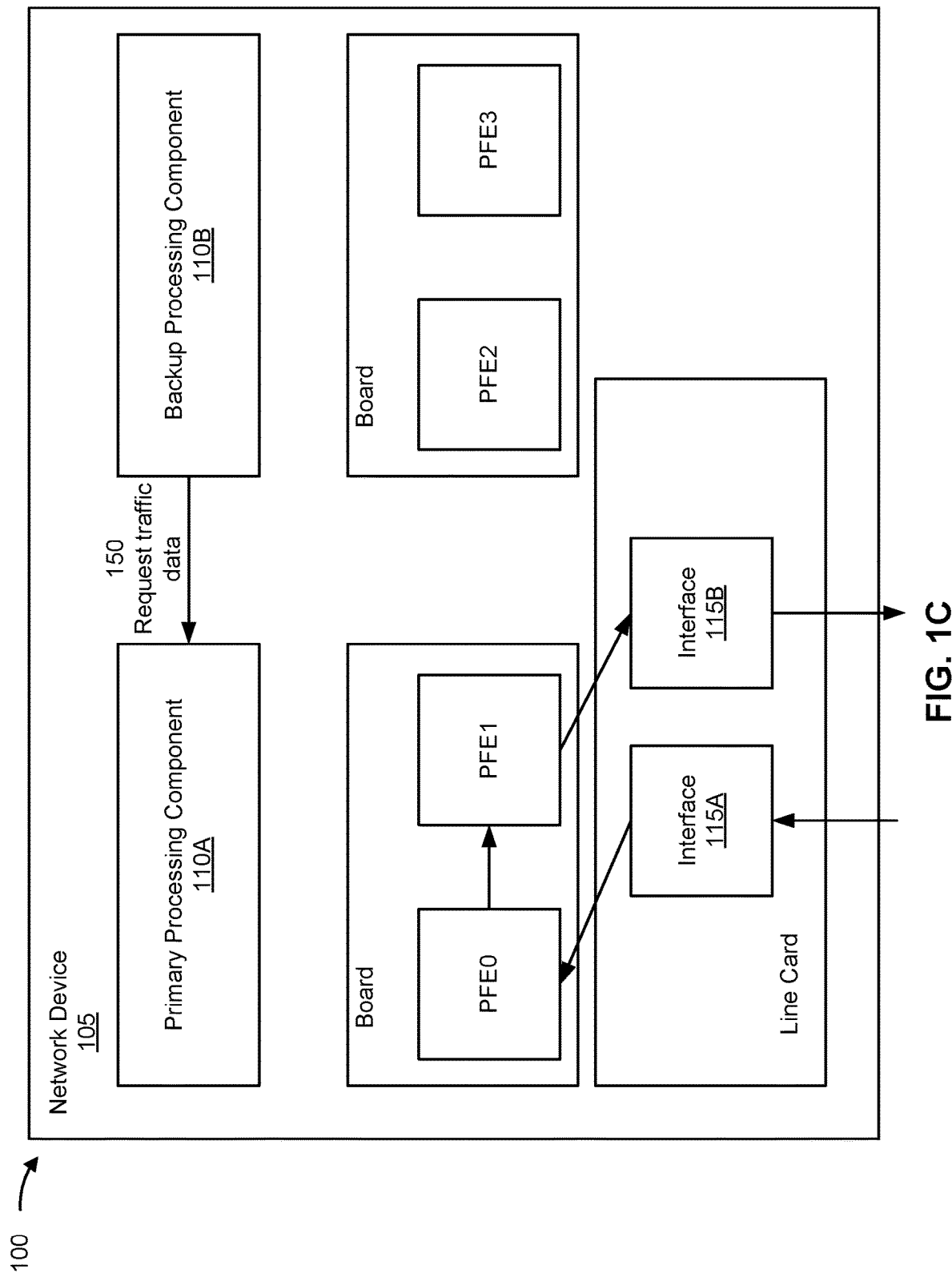

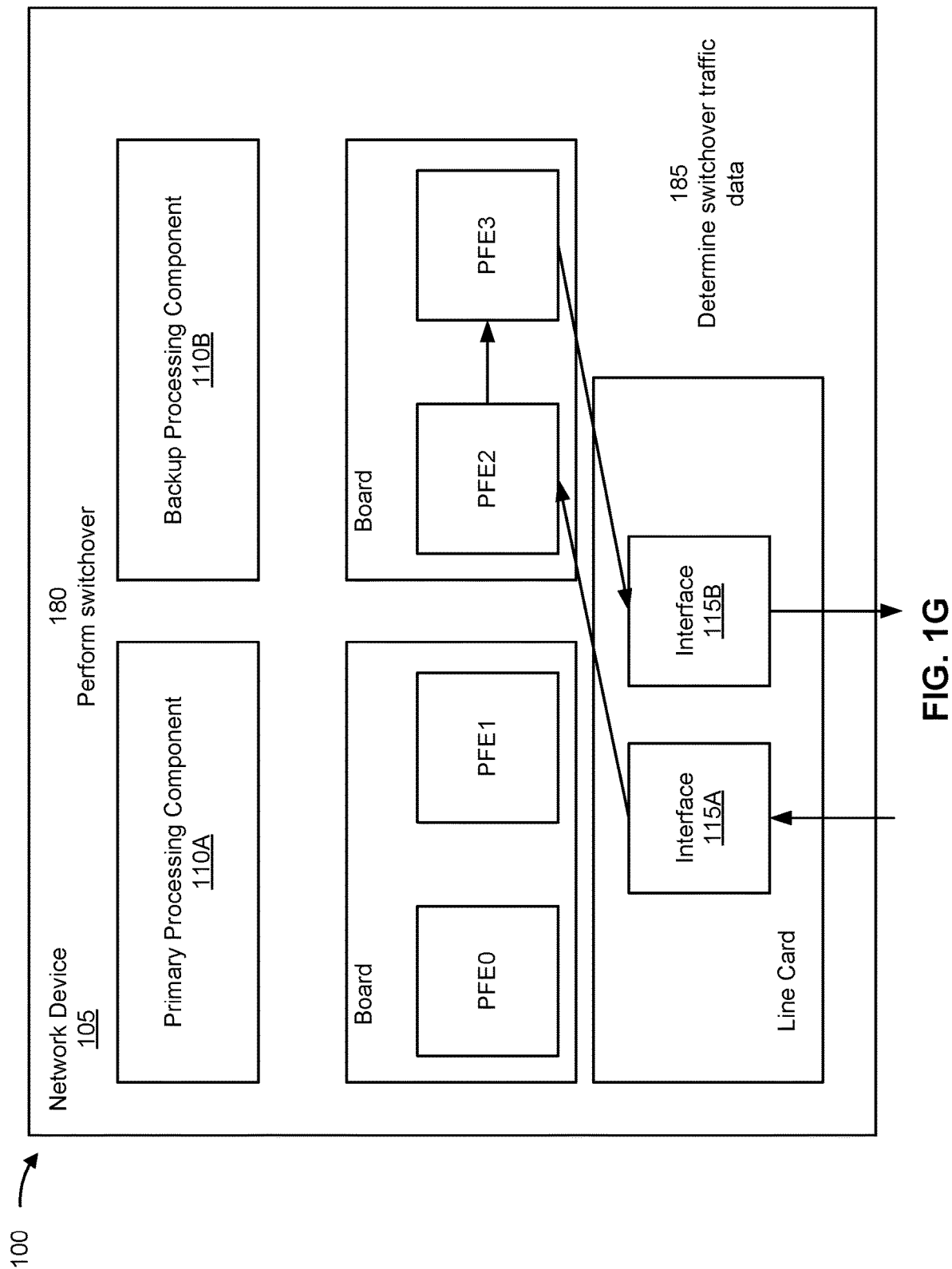

SYSTEMS AND METHODS FOR REPLICATING TRAFFIC STATISTICS ON REDUNDANT PACKET FORWARDING ENGINE SYSTEM

BACKGROUND

Conventional networks typically include network devices that route packets from one or more sources to one or more destinations. A network device may receive packets containing data and control information at input ports and, based on destination or other information included in the packets, route the packets to appropriate output ports for transmitting the packets toward a destination.

SUMMARY

Some implementations described herein relate to a method. The method may include receiving, by a first processing component of a network device, first traffic data obtained by a second processing component of the network device. The method may include storing, by the first processing component, the first traffic data as residual statistics. The method may include obtaining, by the first processing component, second traffic data associated with a copy of a traffic stream processed by the first processing component based on storing the first traffic data as the residual statistics. The method may include performing a switchover from the second processing component to the first processing component. The method may include determining, by the first processing component, current traffic data based on the residual statistics and the second traffic data. The current traffic data may be determined based on performing the switchover from the second processing component to the first processing component.

Some implementations described herein relate to a first processing component of a network device. The first processing component of a network device may include one or more memories and one or more processors. The one or more processors may be configured to receive first traffic data obtained by a second processing component of the network device. The one or more processors may be configured to store the first traffic data as residual statistics. The one or more processors may be configured to obtain second traffic data associated with a copy of a traffic stream processed by the first processing component based on storing the first traffic data as the residual statistics. The one or more processors may be configured to perform a switchover from the second processing component to the first processing component. The one or more processors may be configured to determine current traffic data based on the residual statistics and the second traffic data. The current traffic data may be determined based on performing the switchover.

Some implementations described herein relate to a non-transitory computer-readable medium that stores a set of instructions for a first processing component of a network device. The set of instructions, when executed by one or more processors of the network device, may cause the first processing component to receive first traffic data obtained by a second processing component of the network device. The set of instructions, when executed by one or more processors of the network device, may cause the first processing component to store the first traffic data as residual statistics. The set of instructions, when executed by one or more processors of the network device, may cause the first processing component to obtain second traffic data associated with a copy of a traffic stream processed by the first processing component based on storing the first traffic data as the residual statistics. The set of instructions, when executed by one or more processors of the network device, may cause the first processing component to perform a switchover from the second processing component to the first processing component. The set of instructions, when executed by one or more processors of the network device, may cause the first processing component to determine current traffic data based on the residual statistics and the second traffic data. The current traffic data may be determined based on performing the switchover.

BRIEF DESCRIPTION OF THE DRAWINGS

FIGS. 1A-1G are diagrams of an example implementation described herein.

DETAILED DESCRIPTION

Figure 1A:
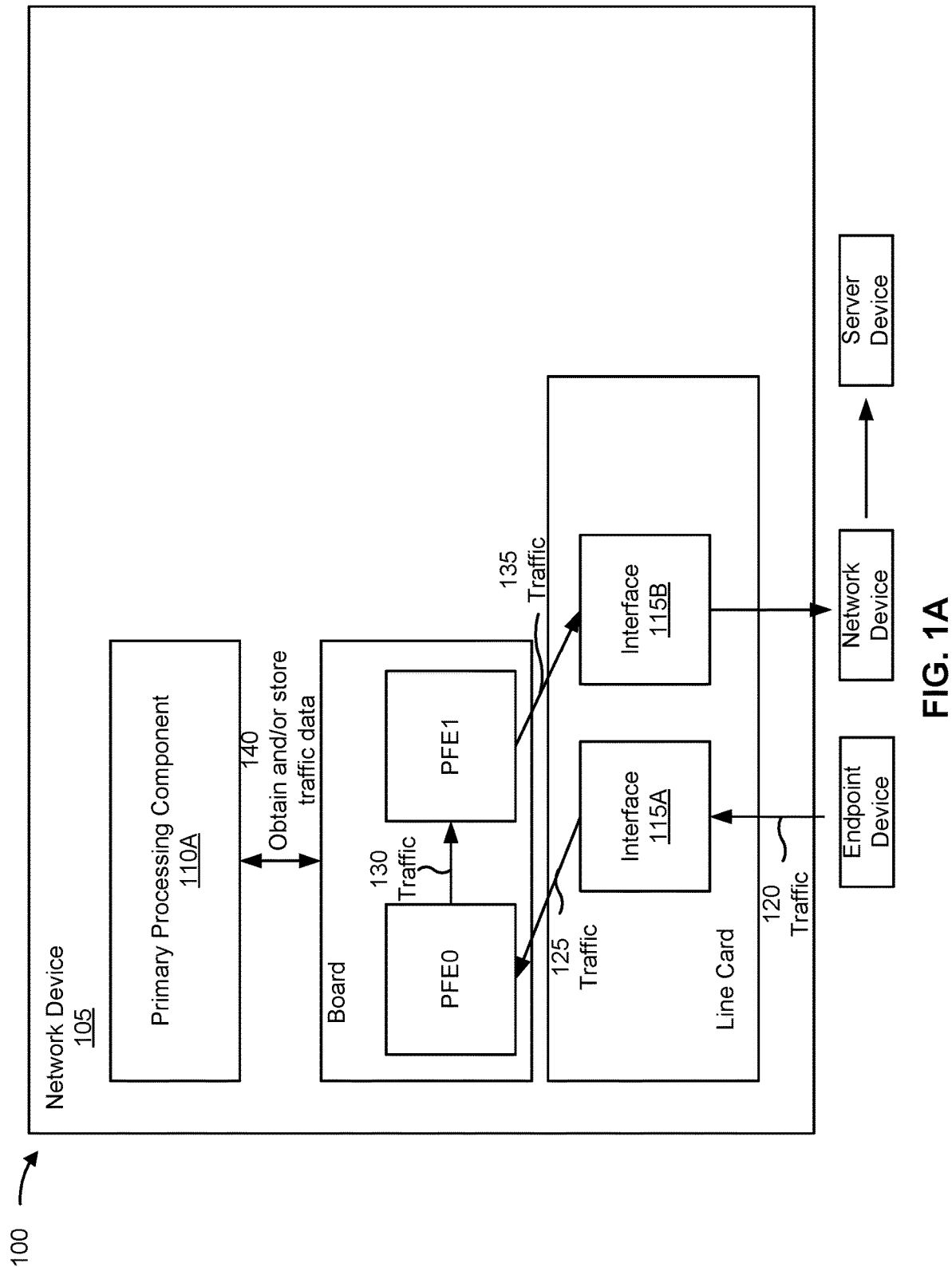

The following detailed description of example implementations refers to the accompanying drawings. The same reference numbers in different drawings may identify the same or similar elements.

In general, a router may receive incoming packets, may determine the next destination (the next "hop" in the network) for the packets, and may output the packets as outbound packets on physical links that lead to the next destination. In this manner, packets are transmitted from router to router in a network until the packets reach their final destination.

In some cases, a router may include a routing engine and a group of one or more packet forwarding engines. The routing engine may include a processing component and may maintain one or more routing tables and a forwarding table. Through the routing tables, the routing engine may consolidate routing information that the routing engine learns from the routing protocols of the network. From this routing information, routing engine may determine active routes to network destinations and install those routes into the forwarding table. A packet forwarding engine of the router may be associated with an interface. The interface may receive a packet and may forward the packet to the packet forwarding engine. The packet forwarding engine may consult (e.g., perform a look-up operation) the forwarding table to determine the next destination for the packet. The packet forwarding engine may forward the packet to another packet forwarding engine associated with an interface for transmitting the packet toward the destination.

In some cases, the router will include a backup routing engine and a backup group of one or more packet forwarding engines. Traffic (e.g., packets) may be duplicated and transmitted to both the group of one or more packet forwarding engines and the backup group of one or more packet forwarding engines and each group of one or more packet forwarding engines may independently forward the traffic toward an interface for transmitting the traffic toward a destination. The interface may receive traffic from both packet forwarding engines and may output traffic received from the primary packet forwarding engine toward the destination and may drop the traffic received from the backup packet forwarding engine.

In some cases, a packet forwarding engine will include one or more counters. The counter may be implemented in hardware and may be utilized to track statistics associated with the packets. For example, a packet forwarding engine may include a counter that is incremented each time a packet is transmitted via a particular interface, a counter that is incremented for each byte of data transmitted via an interface, and/or the like. Periodically, the routing engine may read a counter to obtain traffic statistics associated with the packets, store the traffic statistics in a memory of the routing engine, and reset the counter.

In some cases, the router may perform a switchover in which the backup routing engine and the group of backup packet forwarding engines become the primary routing engine and the primary group of packet forwarding engines. For example, the router may perform a switchover upon a failure of the primary routing engine and/or the group of primary packet forwarding engines. In these cases, the backup routing engine should resume tracking traffic statistics at a point at which the primary routing engine stopped tracking traffic statistics. Although the backup routing engine may track traffic statistics independently based on the duplicated traffic provided to the backup packet forwarding engine, the traffic statistics obtained by the backup routing engine may differ from the traffic statistics obtained by the primary routing engine.

For example, the backup routing engine may be instantiated, and therefore may start receiving the duplicate packets, at some amount of time after the primary routing engine. For a 400 GB Ethernet link, approximately nine million 500-byte packets may pass through the link every second. Thus, even a small time difference between the primary routing engine ceasing to track traffic statistics and the backup routing engine starting to track traffic statistics may result in a large difference between the traffic statistics determined by the primary and backup routing engines. Further, the primary routing engine may track traffic statistics for a large number of components of the router. For example, the primary routing engine may track traffic statistics for about 16,000 interfaces, 32,000 firewall traffic statistics, and 16,000 label switch path statistics, among other examples.

In some cases, to obtain accurate traffic statistics, the backup routing engine may periodically obtain traffic statistics from the primary routing engine. However, the large number of traffic statistics may cause a large steady-state load on the system. The large steady-state load may affect performance of the router. To decrease the steady-state load, the frequency at which the backup routing engine obtains the traffic statistics from the primary routing engine may be decreased. However, decreasing the frequency at which the backup routing engine obtains the traffic statistics may increase the error associated with the traffic statistics when a switchover is performed.

Some implementations described herein enable traffic statistics continuity to be maintained when switching over between redundant routing engines and packet forwarding engines. In some implementations, when a backup component (e.g., a backup logical interface, a backup packet forwarding engine, and/or the like) is created, the backup routing engine will request traffic statistics associated with the corresponding primary component from the primary routing engine. The primary routing engine may receive the request and may provide the traffic statistics to the backup routing engine. In some implementations, the primary routing engine may provide the traffic statistics after periodically reading one or more counters associated with the primary component. The backup routing engine may store the traffic statistics as residual statistics, may reset a counter associated with the backup component, and may begin tracking traffic statistics based on duplicated traffic provided to the backup component. Upon an occurrence of a switchover, the backup routing engine may read the counter associated with the backup component and may add the data read from the counter to the residual data. In this way, the backup routing engine may maintain traffic statistics continuity with the primary routing engine.

Figure 1B:
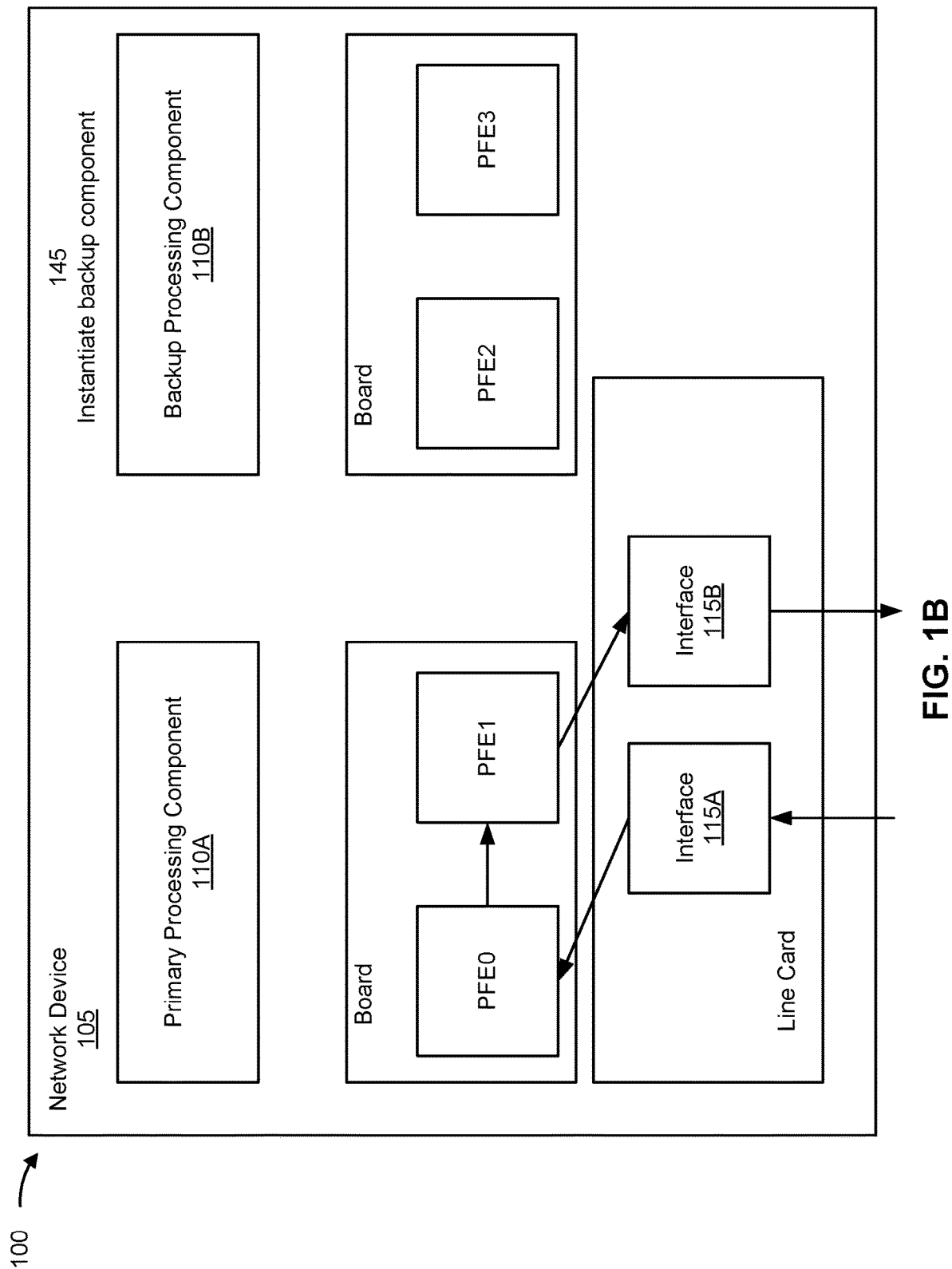

FIGS. 1A-1G are diagrams of an example implementation 100 associated with replicating traffic statistics on a redundant packet forwarding engine system. As shown in FIGS. 1A-1G, example implementation 100 includes a network device 105 that includes a primary processing component 110A and a backup processing component 110B. The primary processing component 110A may be associated with a set of primary packet forwarding engines (e.g., PFE0 and PFE1, as shown in FIG. 1A) implemented on a first board (e.g., a printed circuit board). Similarly, the backup processing component 110B may be associated with a set of backup packet forwarding engines (e.g., PFE2 and PFE3, as shown in FIG. 1B) implemented on a second board. As further shown in FIGS. 1A-1G, the network device 105 may include a group of interfaces (e.g., interface 115A and interface 115B, as shown in FIG. 1A). These devices are described in more detail below in connection with FIGS. 2-4.

As shown in FIG. 1A, and by reference number 120, the network device 105 may receive traffic at interface 115A. For example, the network device 105 may include a router that receives (e.g., via interface 115A) traffic transmitted by an endpoint device via a network.

In some implementations, the primary processing component 110A may include a routing engine and a group of one or more packet forwarding engines. The primary processing component 110A may maintain one or more routing tables and a forwarding table. Through the routing tables, the primary processing component 110A may consolidate routing information that the primary processing component 110A learns from the routing protocols of the network. From this routing information, the routing protocol process may determine the active routes to network destinations and install these routes into the forwarding table. A packet forwarding engine (e.g., PFE0) may be associated with the interface 115A. The interface 115A may receive a packet and may forward the packet to the packet forwarding engine. The packet forwarding engine may consult the forwarding table (e.g., perform a look-up operation) to determine the next destination for the packet (e.g., another network device, as shown in FIG. 1A).

As shown by reference number 130, the packet forwarding engine may forward the packet to another packet forwarding engine (e.g., PFE1) associated with the interface 115B for transmitting the packet toward the next destination. As shown by reference number 135, the packet forwarding engine associated with the interface 115B may forward the packet to the interface 115B. The interface 115B may forward the packet toward the destination of the packet (e.g., a server device, as shown in FIG. 1A) via the next destination (e.g., the other network device, as shown in FIG. 1A) determined for the packet.

As shown by reference number 140, the primary processing component 110A may obtain and/or store traffic data associated with the traffic transmitted through the network device 105. In some implementations, a packet forwarding engine may include a counter. In some implementations, the counter may be implemented in hardware and may be utilized to track statistics associated with traffic transmitted through the network device 105. For example, a packet forwarding engine may include a counter that is incremented each time a packet is transmitted via a particular interface, a counter that is incremented for each byte of data transmitted via an interface, and/or the like. The primary processing component 110A may read the counter to determine a current value of the counter. The primary processing component 110A may store data indicating the current value of the counter as traffic data associated with the counter in a memory associated with the primary processing component 110A.

In some implementations, the primary processing component 110A may cause the counter to be reset based on reading the counter and/or storing the data indicating the current value of the counter. For example, the primary processing component 110A may cause a value of the counter to be reset to an initial value (e.g., zero). In some implementations, the primary processing component 110A may periodically read the counter, store data indicating the value of the counter in the memory, and/or cause the counter to be reset to an initial value.

As shown in FIG. 1B, and by reference number 145, a backup component may be instantiated in the network device 105. In some implementations, the backup component (e.g., the backup processing component 110B, one or more backup packet forwarding engines, one or more backup line cards, and/or the like) may be implemented as a component module that is configured to be received by a port, a connector, a bay, and/or the like of the network device 105. At some time after the primary processing component 110A begins monitoring traffic data, a user may determine to add a new backup component and/or replace an existing backup component to the network device 105. The user may remove an existing backup component and/or insert the new backup component into the port, the connector, and/or the like of the network device 105.

As shown in FIG. 1C, and by reference number 150, the backup processing component 110B may request traffic data from the primary processing component 110A based on the backup component being instantiated in the network device 105. In some implementations, the backup component includes a single component and the backup processing component 110B requests traffic data associated with a primary component corresponding to the backup component.

For example, the backup component may include a backup packeting forwarding engine (e.g., PFE2, as shown in FIG. 1C) and the backup processing component 110B may request traffic data associated with the corresponding primary packet forwarding engine (e.g., PFE0, as shown in FIG. 1C). In some implementations, the backup component includes a group of backup components and the backup processing component 110B requests traffic data associated with the corresponding group of primary components in a manner similar to that described above.

In some implementations, the backup component includes a group of backup components and the backup processing component 110B requests traffic data associated with a group of primary components corresponding to the group of backup components. In some implementations, the backup processing component 110B transmits multiple requests for the traffic data associated with the group of primary components. For example, the backup processing component 110B may transmit a first request for traffic data associated with a first backup component. The backup processing component 110B may transmit a second request for traffic data associated with a second backup component based on receiving the current traffic data associated with the first backup component, based on an expiration of a time period, based on receiving an acknowledgement associated with the first request, and/or the like. In this way, the backup processing component 110B may minimize a load associated with the primary processing component 110A providing the current traffic data associated with the group of primary components relative to transmitting a single request for traffic data associated with the group of primary components.

Figure 1D:
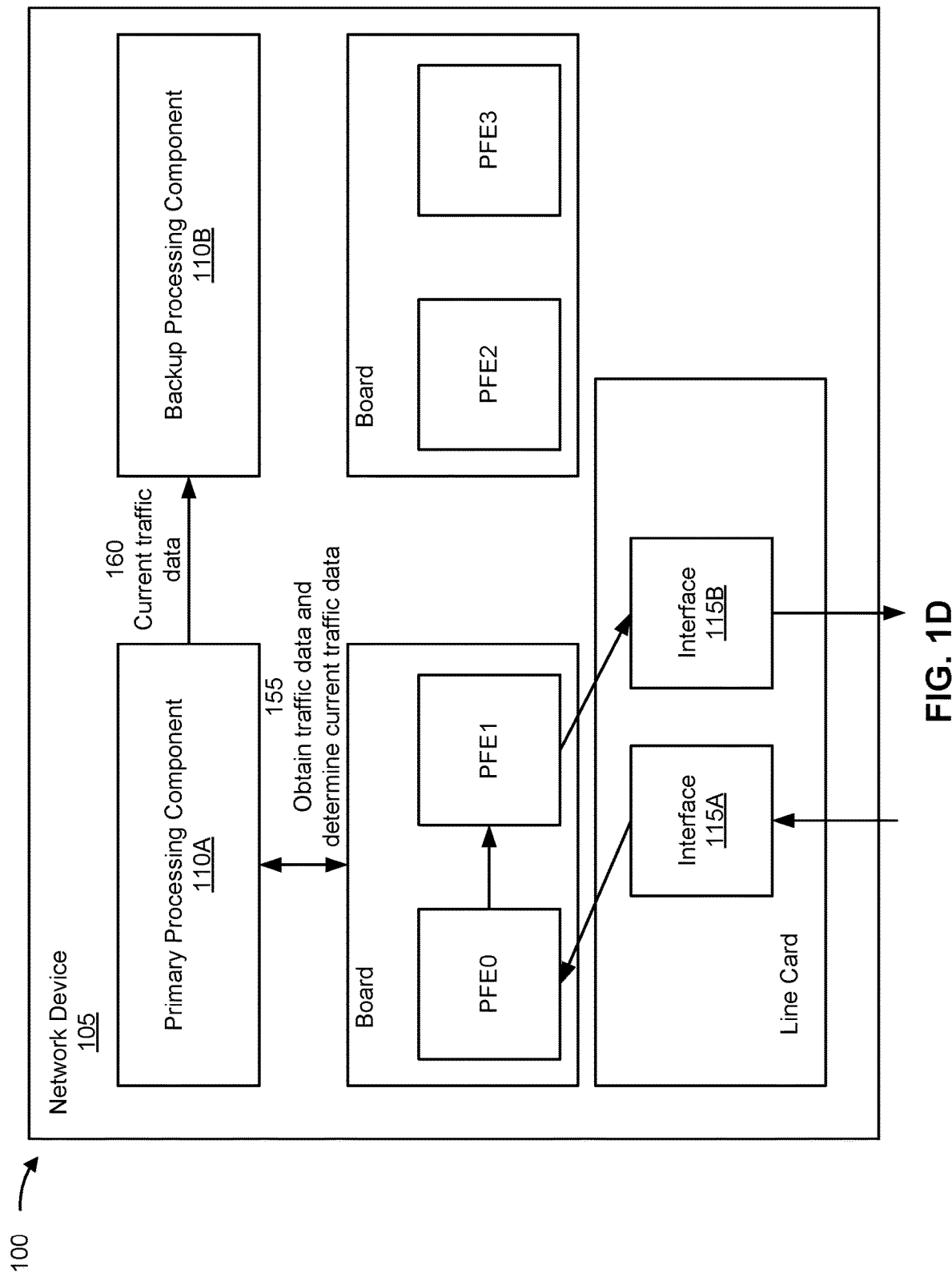

As shown in FIG. 1D, and by reference number 155, the primary processing component 110A may obtain traffic data and may determine current traffic data based on the request. In some implementations, the request may indicate one or more primary components for which traffic data is requested. The primary processing component 110A may obtain the traffic data and may determine the current traffic data for the one or more primary components indicated in the request.

In some implementations, the primary processing component 110A may obtain the current traffic data at the end of a time period associated with periodically obtaining traffic data from the one or more primary components. As an example, the primary processing component 110A may initiate a timer based on resetting a counter associated with a primary component to an initial value, as described elsewhere herein. Upon expiration of the timer, the primary processing component 110A may obtain new traffic data associated with the primary component. The primary processing component 110A may generate the current traffic data based on the new traffic data and the stored traffic data. For example, the primary processing component 110A may generate the current traffic data based on adding the new traffic data to the stored traffic data.

As shown by reference number 160, the primary processing component 110A may provide current traffic data to the backup processing component 110B in response to the request. The current traffic data may include the new traffic data associated with the primary component and the stored traffic data associated with the primary component. By providing the traffic data after obtaining the new traffic data from the primary component, the primary processing component 110A may minimize a difference between the traffic data provided to the backup processing component 110B and the traffic data maintained by the primary processing component 110A.

As an example, the primary processing component 110A may obtain new traffic data for the primary component every second. The traffic data stored in the memory of the primary processing component 110A, therefore, may fail to account for traffic transmitted through the network device 105 during a time period starting at a time that the traffic data was last obtained from the primary component and ending at a time prior to new traffic data being obtained.

Figure 1E:
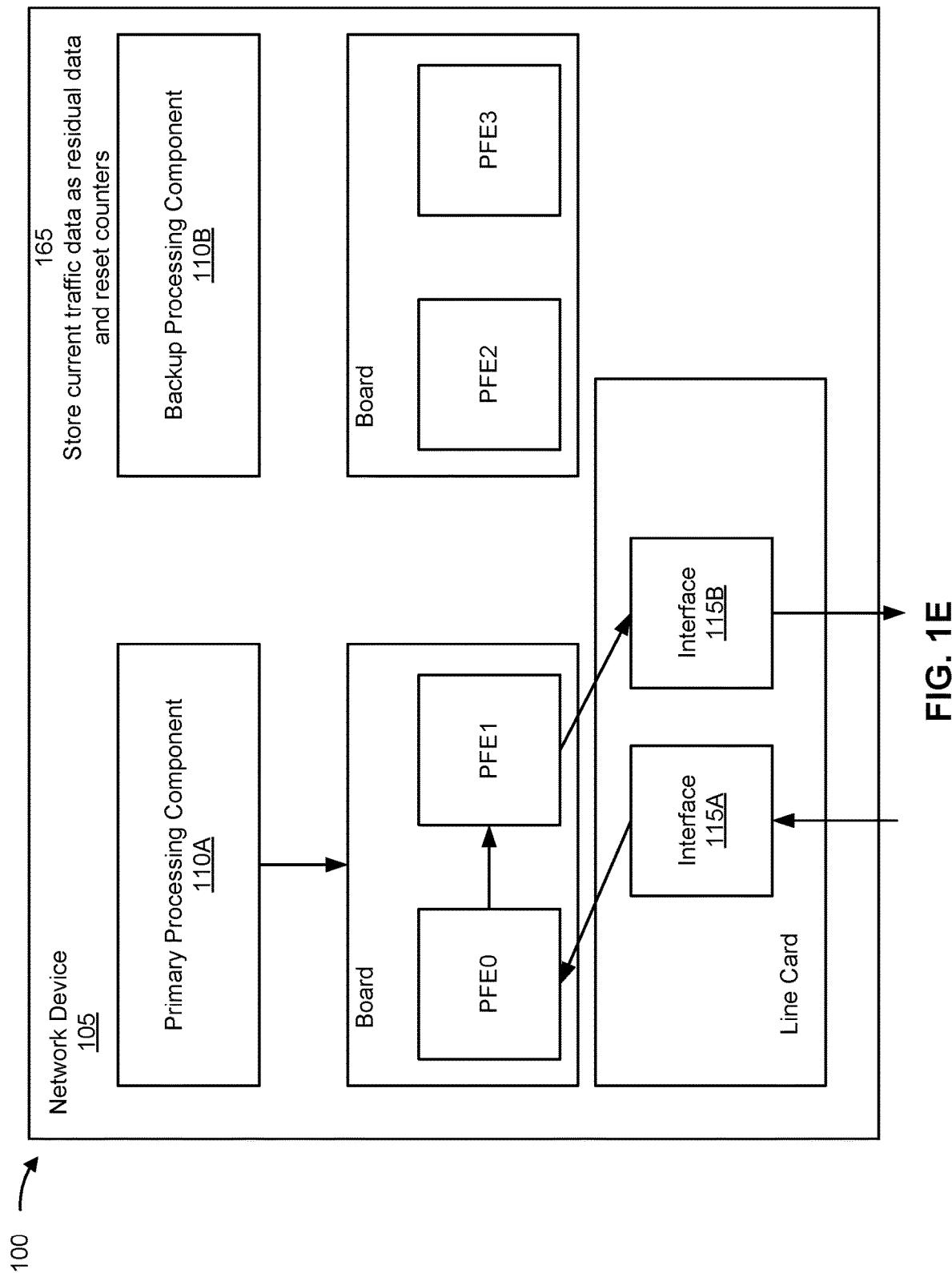

As shown in FIG. 1E, and by reference number 165, the backup processing component 110B may store the current traffic data received from the primary processing component 110A as residual data associated with the backup component and may reset one or more counters associated with the backup component. As an example, the backup component may include a backup packet forwarding engine (e.g., PFE2). The backup processing component 110B may receive current traffic data associated with a corresponding primary packet forwarding engine (e.g., PFE0) and may store the current traffic data as residual data associated with the backup packet forwarding engine. The backup processing component 110B may reset a counter associated with the backup packet forwarding engine based on receiving the current traffic data and/or storing the current traffic data as the residual data associated with the backup packet forwarding engine.

In some implementations, the backup processing component 110B may obtain host transmitted traffic data associated with host transmitted packets. A host transmitted packet may include a packet generated by the primary processing component 110A and transmitted through the network device 105 (e.g., via one or more primary packet forwarding engines). For example, a host transmitted packet may include a protocol packet generated by the primary processing component 110A and transmitted through the network device 105 to a peer network device.

In some implementations, the backup processing component 110B may modify the residual data based on the host transmitted traffic data. In some implementations, the backup processing component 110B may determine to track traffic data associated with non-host transmitted packets. The backup processing component 110B may modify the residual data based on subtracting the host transmitted traffic data from the residual data to remove the host transmitted traffic data from the residual data.

In some implementations, the backup processing component 110B may determine not to modify the residual data based on the host transmitted traffic data. In some implementations, the backup processing component 110B may determine not to modify the residual data based on the host transmitted traffic data when the host transmitted traffic data satisfies a threshold (e.g., when the host transmitted data is less than a threshold percentage (e.g., 0.01% or 0.015%, among other examples) of the residual data).

In some implementations, the backup processing component 110B may not obtain the host transmitted traffic data. For example, the backup processing component 110B may request the host transmitted traffic data from the primary processing component 110A. The primary processing component 110A may determine that the host transmitted traffic data satisfies a threshold. The primary processing component 110A may transmit a response to the request to the backup processing component 110B. The response may indicate that the host transmitted traffic data satisfies the threshold and/or that the primary processing component 110A is not providing the host transmitted traffic data to the backup processing component 110B.

Figure 1F:
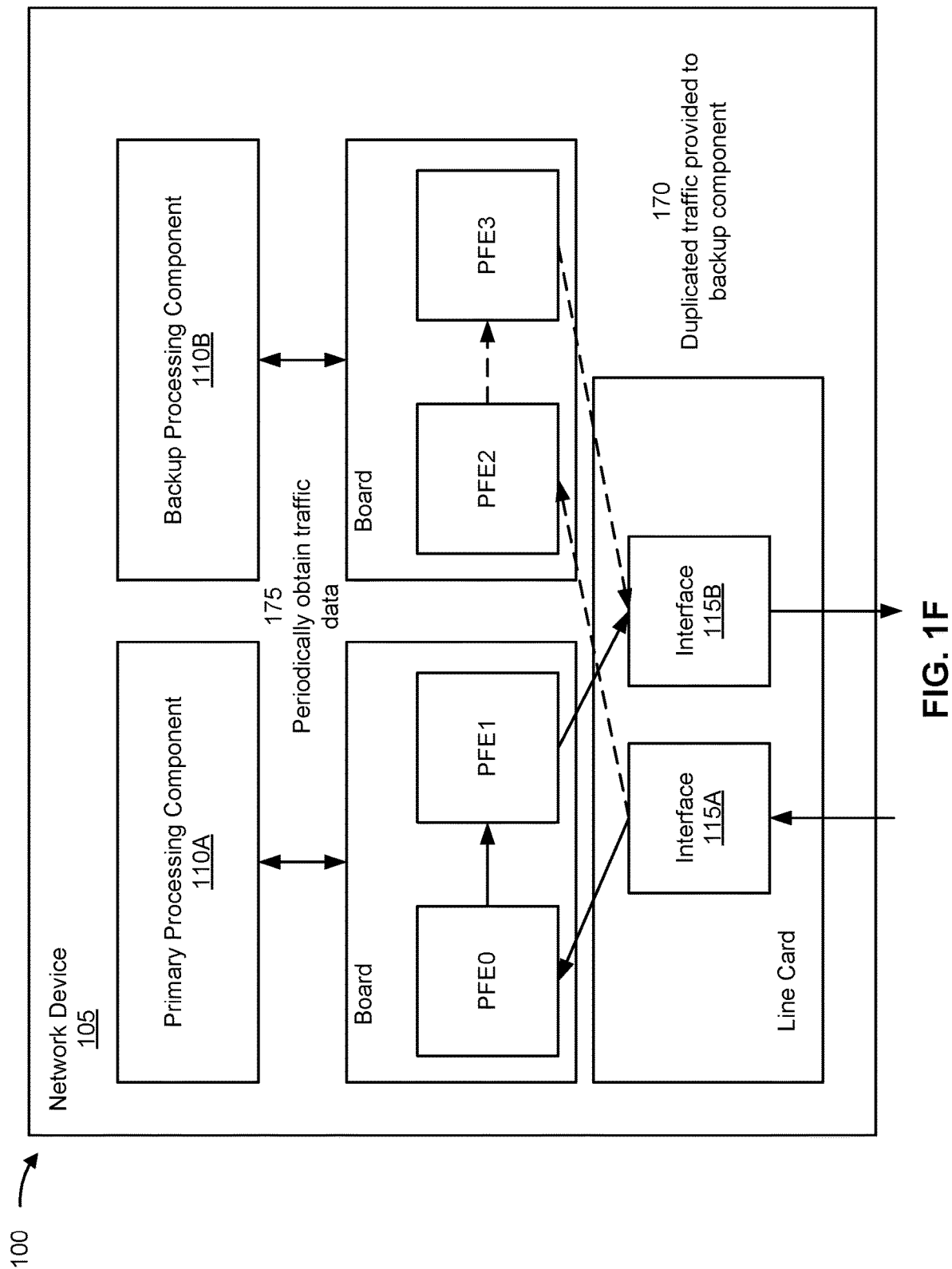

As shown in FIG. 1F, and by reference number 170, duplicated traffic may be provided to the backup component. As an example, a packet may be received at the interface 115A. The interface 115A may generate a copy of the packet. The interface 115A may forward the received packet to the primary packet forwarding engine (e.g., PFE0) associated with the interface 115A. The primary packet forwarding engine may receive the packet and increment a counter associated with the primary packet forwarding engine based on receiving the packet. The primary packet forwarding engine may forward the packet to another primary packet forwarding engine (e.g., PFE1), in a manner similar to that described elsewhere herein.

The interface 115A may forward the copy of packet to the backup packet forwarding engine (e.g., PFE2) corresponding to the primary packet forwarding engine. The backup forwarding engine may increment a counter associated with the backup packet forwarding engine for tracking traffic data associated with the backup packet forwarding engine and may forward the copy of the packet to another backup packet forwarding engine in a manner similar to that described above with respect to the primary packet forwarding engine.

The interface 115B may receive the packet from the primary packet forwarding engine and may receive the copy of the packet from the backup packet forwarding engine. The interface 115B may forward the packet received from the primary packet forwarding engine toward a destination associated with the packet based on receiving the packet from the primary packet forwarding engine. The interface 11B may drop or discard the copy of the packet based on receiving the copy of the packet from the backup packet forwarding engine.

In some implementations, the duplicated traffic includes duplicated host transmitted packets. The primary processing component 110A may duplicate host transmitted packets generated by the primary processing component 110A and may provide the duplicated host transmitted packets to the backup processing component 110B. The backup processing component 110B may forward the duplicated host transmitted packets through the backup components. The backup components may increment a counter based on forwarding the duplicated host transmitted packets through the network device 105 to track host transmitted traffic data associated with the host transmitted packets in a manner similar to that described elsewhere herein.

As shown in FIG. 1G, and by reference number 180, the network device 105 may perform a switchover from the primary processing component 110A to the backup processing component 110B. Performing the switchover may cause the backup processing component 110B and the backup packet forwarding engines to operate as the primary processing component and primary packet forwarding engines, respectively. For example, the network device 105 may determine a failure of the primary processing component 110A and/or one or more of the primary packet forwarding engines. The network device 105 may perform a switchover to cause the backup processing component 110B and the backup packet forwarding engines to operate as the primary processing component and primary packet forwarding engines, respectively, based on the failure of the primary processing component 110A and/or the one or more of the primary packet forwarding engines.

As shown by reference number 185, the backup processing component 110B may determine switchover traffic data based on performing the switchover. The switchover traffic data may correspond to the traffic data determined by the primary processing component 110A prior to performing the switchover. The backup processing component 110B may determine the switchover traffic data to continue monitoring the traffic data associated with traffic transmitted through the network device at a point at which the primary processing component 110A stopped monitoring the traffic data.

In some implementations, the backup processing component 110B may determine the switchover traffic data based on monitoring the duplicated traffic and the stored residual data. For example, the backup processing component 110B may read one or more counters associated with the backup packet forwarding engines based on performing the switchover. The backup processing component 110B may determine current traffic data based on reading the one or more counters. The backup processing component 110B may add the residual data to the current traffic data to determine the switchover traffic data.

In some implementations, the backup processing component 110B may determine the switchover traffic data based on the host transmitted traffic data. For example, the backup processing component 110B may modify the residual data based on the host transmitted traffic data obtained from the primary processing component 110A, as described above. As another example, the backup processing component 110B may obtain the host transmitted traffic data from the primary processing component 110A and may store the host transmitted traffic data in a memory associated with the backup processing component 110B. The backup processing component 110B may obtain the host transmitted traffic data from the memory based on performing the switchover and may add the host transmitted traffic data to the residual data.

In some implementations, the backup processing component 110B may store the switchover traffic data in a memory associated with the backup processing component 110B based on determining the switchover traffic data. In some implementations, the backup processing component 110B may cause the one or more counters associated with the backup packet forwarding engines to be reset based on reading the one or more counters associated with the packet forwarding engines, determining the switchover traffic data, and/or storing the switchover traffic data in the memory.

The backup processing component 110B may monitor traffic data associated with traffic transmitted through the network device 105 based on determining and/or storing the switchover traffic data. In some implementations, the backup processing component 110B may monitor the traffic data associated with traffic transmitted through the network device 105 in a manner similar to that described elsewhere herein. In this way, the backup processing component 110B may utilize the switchover traffic data to continue monitoring the traffic data associated with traffic transmitted through the network device at a point at which the primary processing component 110A stopped monitoring the traffic data.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
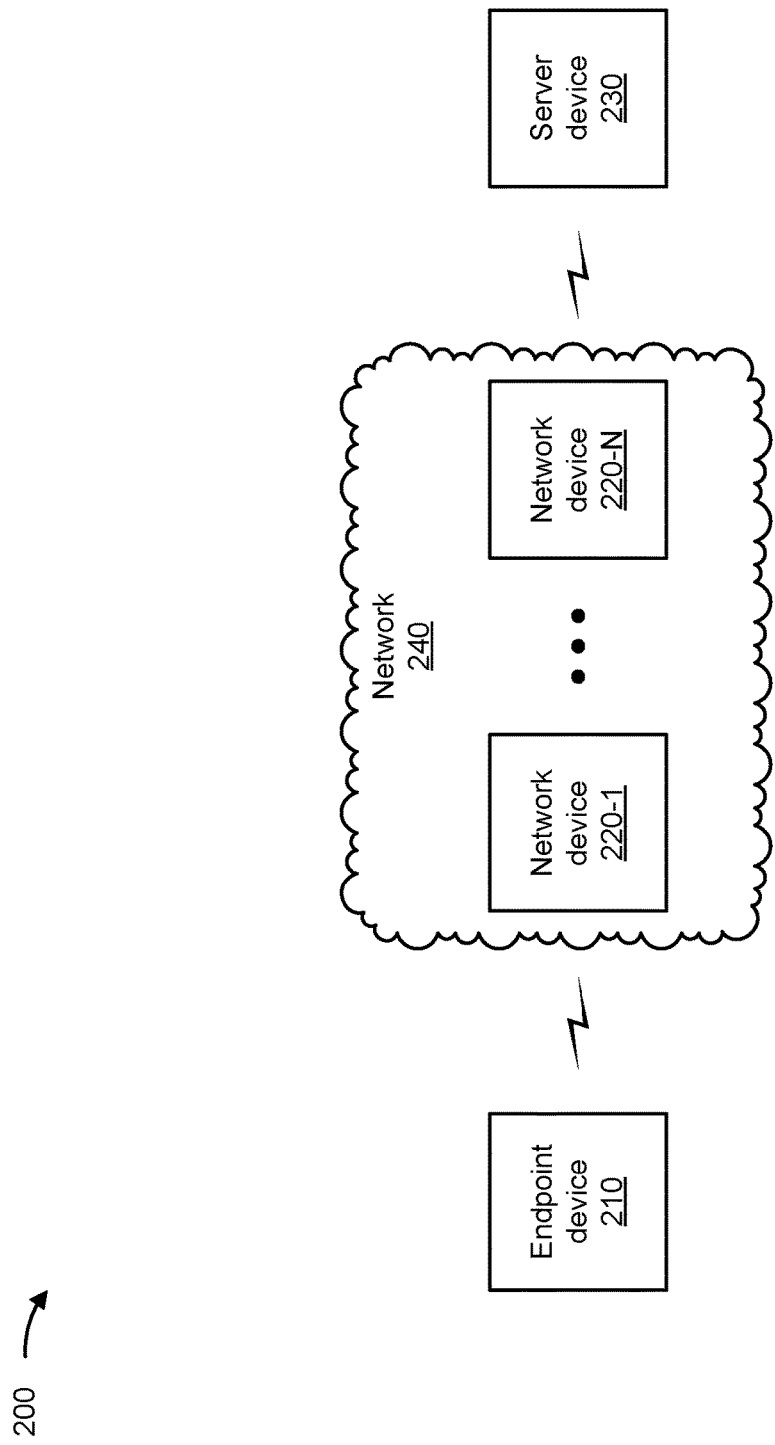
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an endpoint device 210, a group of network devices 220 (shown as network device 220-1 through network device 220-N), a server device 230, and a network 240. Devices of environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, the endpoint device 210 may receive network traffic from and/or may provide network traffic to other endpoint devices 210 and/or the server device 230, via network 240 (e.g., by routing packets using the network devices 220 as intermediaries).

The network device 220 may correspond to network device 105 and includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through network 240.

The server device 230 includes one or more devices capable of receiving, generating, storing, processing, and/or providing information, such as information described herein. For example, the server device 230 may include a laptop computer, a tablet computer, a desktop computer, a group of server devices, or a similar type of device, associated with multicast traffic. In some implementations, the server device 230 may receive information from and/or transmit information (e.g., multicast traffic) to the endpoint device 210, via the network 240 (e.g., by routing packets using the network devices 220 as intermediaries).

The network 240 includes one or more wired and/or wireless networks. For example, the network 240 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
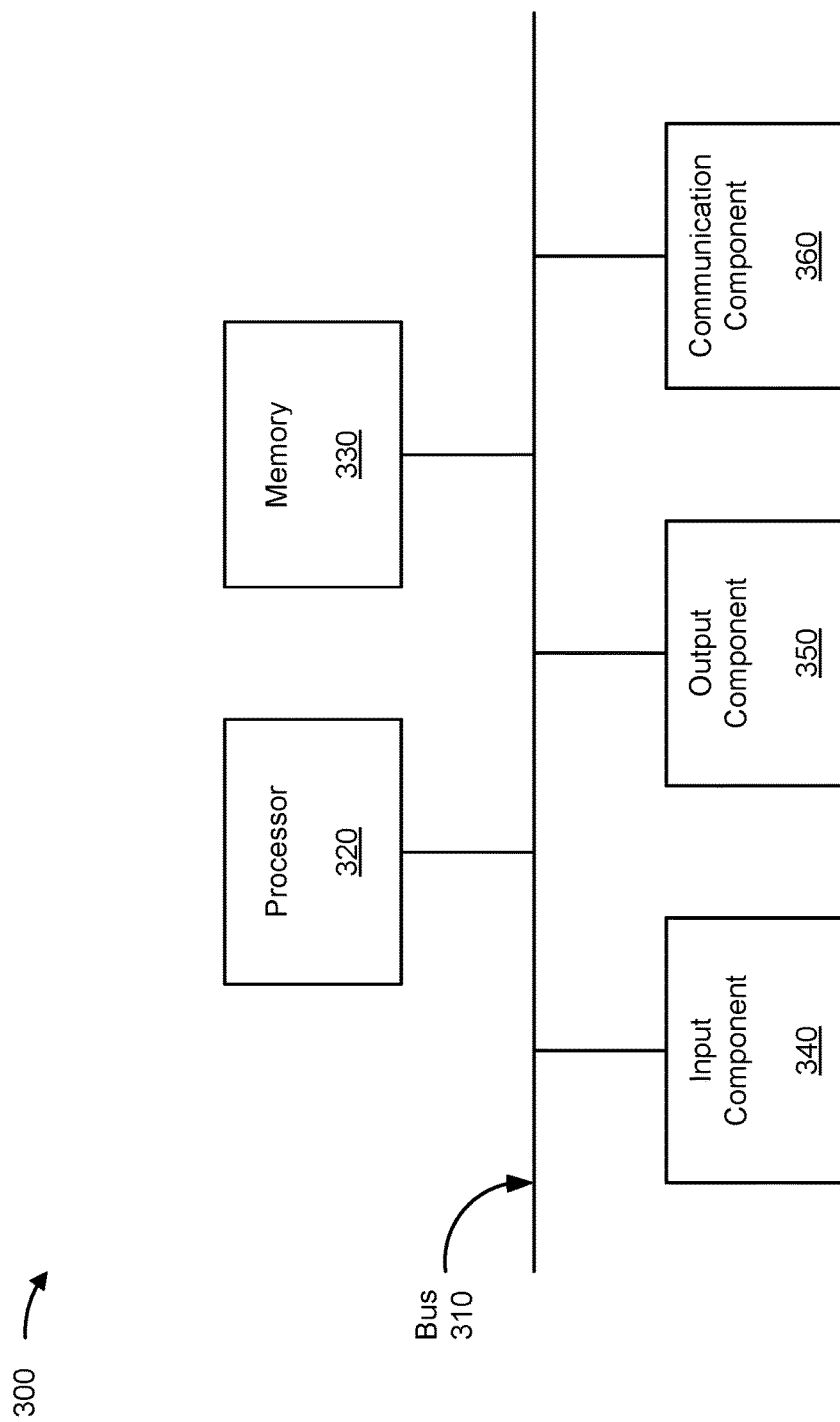
FIGS. 3 and 4 are diagrams of example components of one or more devices of FIG. 2.

FIG. 3 is a diagram of example components of a device 300, which may correspond to the endpoint device 210, the network device 220, and/or the server device 230. In some implementations, the endpoint device 210, the network device 220, and/or the server device 230 include one or more devices 300 and/or one or more components of device 300. As shown in FIG. 3, device 300 may include a bus 310, a processor 320, a memory 330, an input component 340, an output component 350, and a communication component 360.

The bus 310 includes one or more components that enable wired and/or wireless communication among the components of device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of device 300. In some implementations, the memory 330 includes one or more memories that are coupled to one or more processors (e.g., processor 320), such as via bus 310.

The input component 340 enables device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables device 300 to provide output, such as via a display, a speaker, and/or a light-emitting diode. The communication component 360 enables device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
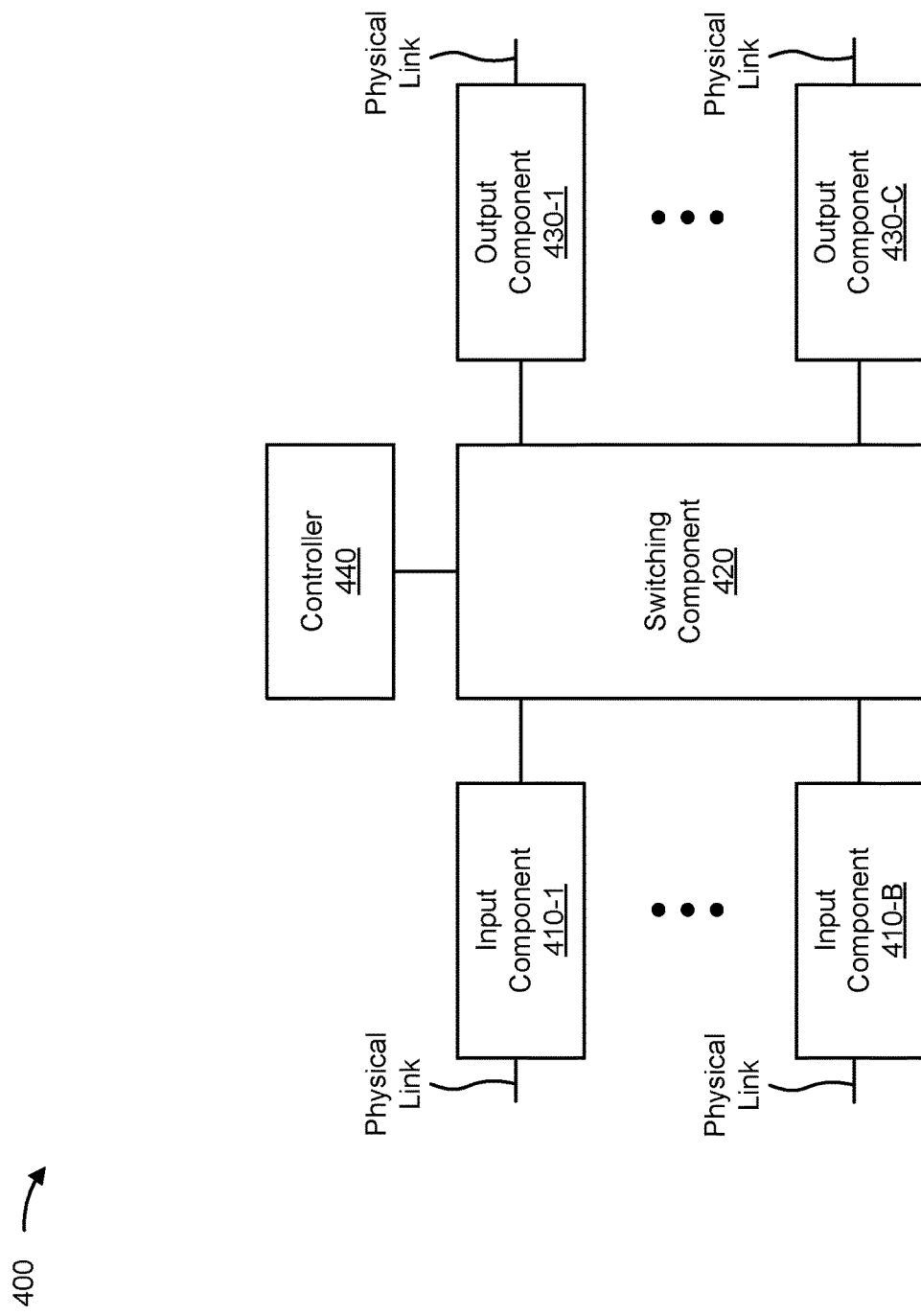

FIG. 4 is a diagram of example components of a device 400. Device 400 may correspond to the endpoint device 210, the network device 220, and/or the server device 230. In some implementations, the endpoint device 210, the network device 220, and/or the server device 230 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., an input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or the output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
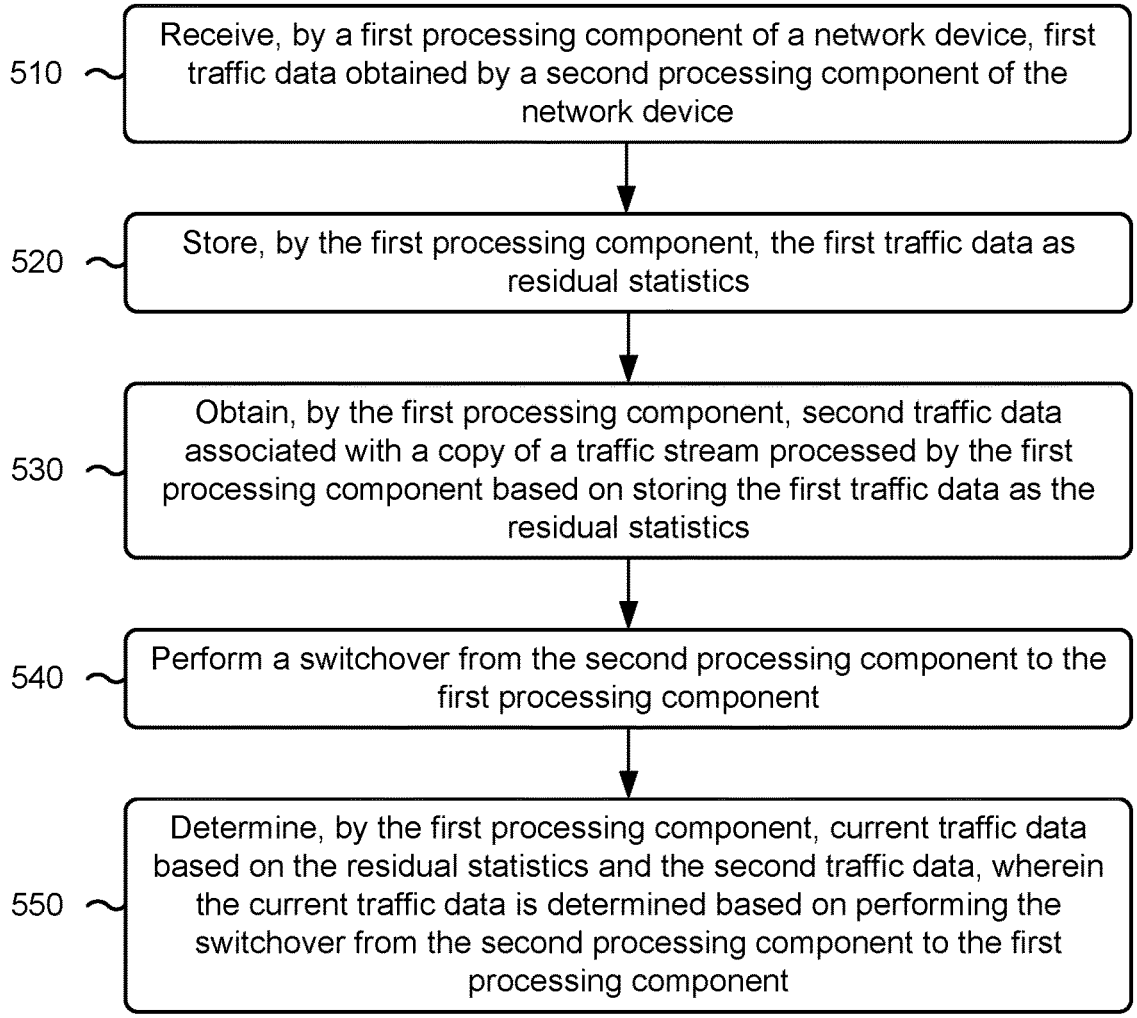
FIG. 5 is a flowchart of an example process relating to replicating traffic statistics on a redundant packet forwarding engine system.

FIG. 5 is a flowchart of an example process 500 associated with systems and methods for replicating traffic statistics on a redundant packet forwarding engine system. In some implementations, one or more process blocks of FIG. 5 are performed by a first processing component (e.g., backup processing component 110B). In some implementations, one or more process blocks of FIG. 5 are performed by another device or a group of devices separate from or including the first processing component, such as a network device (e.g., network device 105), a primary processing component (e.g., primary processing component 110A), a packet forwarding engine (e.g., PFE0, PFE1, PFE2, PFE3), and/or an interface (e.g., interface 115A, interface 115B). Additionally, or alternatively, one or more process blocks of FIG. 5 may be performed by one or more components of device 300, such as the processor 320, the memory 330, the input component 340, the output component 350, the communication component 360, the input component 410, the switching component 420, the output component 430, and/or the controller 440.

As shown in FIG. 5, process 500 may include receiving first traffic data obtained by a second processing component of the network device (block 510). For example, the first processing component may receive first traffic data obtained by a second processing component of the network device, as described above.

As further shown in FIG. 5, process 500 may include storing the first traffic data as residual statistics (block 520). For example, the first processing component may store the first traffic data as residual statistics, as described above.

As further shown in FIG. 5, process 500 may include obtaining second traffic data associated with a copy of a traffic stream processed by the first processing component based on storing the first traffic data as the residual statistics (block 530). For example, the first processing component may obtain second traffic data associated with a copy of a traffic stream processed by the first processing component based on storing the first traffic data as the residual statistics, as described above.

As further shown in FIG. 5, process 500 may include performing a switchover from the second processing component to the first processing component (block 540). For example, the first processing component may perform a switchover from the second processing component to the first processing component, as described above.

As further shown in FIG. 5, process 500 may include determining current traffic data based on the residual statistics and the second traffic data, wherein the current traffic data is determined based on performing the switchover from the second processing component to the first processing component (block 550). For example, the first processing component may determine current traffic data based on the residual statistics and the second traffic data, wherein the current traffic data is determined based on performing the switchover from the second processing component to the first processing component, as described above.

Process 500 may include additional implementations, such as any single implementation or any combination of implementations described below and/or in connection with one or more other processes described elsewhere herein.

In a first implementation, the first processing component is a backup processing component and the second processing component is a primary processing component.

In a second implementation, alone or in combination with the first implementation, receiving the first traffic data comprises transmitting a request for the first traffic data to the second processing component, wherein the request indicates one or more components associated with the second processing component, and wherein the first traffic data indicates one or more traffic statistics associated with the one or more components.

In a third implementation, alone or in combination with one or more of the first and second implementations, the one or more components include one or more components for routing packets through the network device.

In a fourth implementation, alone or in combination with one or more of the first through third implementations, the second processing component provides the first traffic data to the first processing component based on the second processing component reading a counter implemented in hardware.

In a fifth implementation, alone or in combination with one or more of the first through fourth implementations, obtaining the second traffic data comprises clearing a hardware-implemented counter based on storing the first traffic data as the residual statistics, and utilizing the hardware-implemented counter to obtain the second traffic data.

In a sixth implementation, alone or in combination with one or more of the first through fifth implementations, process 500 includes receiving copies of host transmitted packets transmitted by the second processing component, wherein the second traffic data includes traffic data associated with the copies of the host transmitted packets.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of a list of" items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a first processing component of a network device, first traffic data, associated with one or more primary counters, obtained by a second processing component of the network device;
    storing, by the first processing component, the first traffic data as residual statistics;
    obtaining, by the first processing component, second traffic data associated with a copy of a traffic stream processed by the first processing component based on storing the first traffic data as the residual statistics;
    performing a switchover from the second processing component to the first processing component; and
    determining, by the first processing component, current traffic data based on the residual statistics and the second traffic data, wherein the current traffic data is determined based on performing the switchover from the second processing component to the first processing component,
        wherein determining the current traffic data comprises:
            determining the current traffic data based on adding the residual statistics to statistics based on reading one or more backup counters.

2. The method of claim 1, wherein the first processing component is a backup processing component and the second processing component is a primary processing component.

3. The method of claim 1, wherein receiving the first traffic data comprises:
    transmitting a request for the first traffic data to the second processing component, wherein the request indicates one or more components associated with the second processing component, and wherein the first traffic data indicates one or more traffic statistics associated with the one or more components.

4. The method of claim 3, wherein the one or more components include one or more components for routing packets through the network device.

5. The method of claim 1, wherein the second processing component provides the first traffic data to the first processing component based on the second processing component reading a counter implemented in hardware,
    wherein the counter is utilized to track statistics associated with packet transmission.

6. The method of claim 1, wherein obtaining the second traffic data comprises:
    clearing a hardware-implemented counter based on storing the first traffic data as the residual statistics, wherein the hardware-implemented counter is utilized to track statistics associated with packet transmission; and utilizing the hardware-implemented counter to obtain the second traffic data.

7. The method of claim 1, further comprising:

receiving copies of host transmitted packets transmitted by the second processing component, wherein the second traffic data includes traffic data associated with the copies of the host transmitted packets.

8. A first processing component of a network device, comprising:

one or more memories; and
one or more processors to:
receive first traffic data, associated with one or more primary counters, obtained by a second processing component of the network device;
store the first traffic data as residual statistics;
obtain second traffic data associated with a copy of a traffic stream processed by the first processing component based on storing the first traffic data as the residual statistics;
perform a switchover from the second processing component to the first processing component; and
determine current traffic data based on the residual statistics and the second traffic data, wherein the current traffic data is determined based on performing the switchover,
wherein the one or more processors, to determine the current traffic data, are configured to determine the current traffic data based on adding the residual statistics to statistics based on reading one or more backup counters.

9. The first processing component of claim 8, wherein the one or more processors are further to:

transmit a request for the first traffic data to the second processing component, wherein the request indicates one or more components associated with the second processing component, wherein the first traffic data indicates one or more traffic statistics associated with the one or more components, and wherein the one or more components include one or more components for routing packets through the network device.

10. The first processing component of claim 8, wherein the one or more processors, to obtain the second traffic data, are to:

clear a hardware-implemented counter based on storing the first traffic data as the residual statistics,
wherein the hardware-implemented counter is utilized to track statistics associated with packet transmission; and
utilize the hardware-implemented counter to obtain the second traffic data.

11. The first processing component of claim 8, wherein the one or more processors are further to:

receive copies of host transmitted packets transmitted by the second processing component, wherein the second traffic data includes traffic data associated with the copies of the host transmitted packets.

12. The first processing component of claim 8, wherein the one or more processors are further to:

obtain statistics associated with host transmitted packets, wherein the host transmitted packets include one or more packets transmitted by the second processing component; and
modify the residual statistics based on the statistics associated with the host transmitted packets.

13. The first processing component of claim 12, wherein the one or more processors, to modify the residual statistics based on the statistics associated with the host transmitted packets, are to:

subtract the statistics associated with the host transmitted packets from the residual statistics.

14. The first processing component of claim 8, wherein statistics associated with host transmitted packets transmitted by the second processing component are not included in the second traffic data.

15. A non-transitory computer-readable medium storing a set of instructions, the set of instructions comprising:

one or more instructions that, when executed by one or more processors of a first processing component of a network device, cause the first processing component to:
receive first traffic data, associated with one or more primary counters, obtained by a second processing component of the network device;
store the first traffic data as residual statistics;
obtain second traffic data associated with a copy of a traffic stream processed by the first processing component based on storing the first traffic data as the residual statistics;
perform a switchover from the second processing component to the first processing component; and
determine current traffic data based on the residual statistics and the second traffic data, wherein the current traffic data is determined based on performing the switchover,
wherein the one or more instructions, that cause the one or more processors to determine the current traffic data, cause the one or more processors to determine the current traffic data based on adding the residual statistics to statistics based on reading one or more backup counters.

16. The non-transitory computer-readable medium of claim 15, wherein the first processing component is a backup processing component and the second processing component is a primary processing component.

17. The non-transitory computer-readable medium of claim 15, wherein the one or more instructions, that cause the first processing component to receive the first traffic data, cause the first processing component to:

transmit a request for the first traffic data to the second processing component, wherein the request indicates one or more components associated with the second processing component, and wherein the first traffic data indicates one or more traffic statistics associated with the one or more components.

18. The non-transitory computer-readable medium of claim 15, wherein the one or more instructions, that cause the first processing component to obtain the second traffic data, cause the first processing component to:

clear a hardware-implemented counter based on storing the first traffic data as the residual statistics,
wherein the hardware-implemented counter is utilized to track statistics associated with packet transmission; and
utilize the hardware-implemented counter to obtain the second traffic data.

19. The non-transitory computer-readable medium of claim 15, wherein the one or more instructions further cause the first processing component to:

receive copies of host transmitted packets transmitted by the second processing component, wherein the second traffic data includes traffic data associated with the copies of the host transmitted packets.

20. The non-transitory computer-readable medium of claim 15, wherein the one or more instructions further cause the first processing component to:
   obtain statistics associated with host transmitted packets, wherein the host transmitted packets include one or more packets transmitted by the second processing component; and
   modify the residual statistics based on the statistics associated with the host transmitted packets.

* * * * *